United States Patent Office 3,752,816
Patented Aug. 14, 1973

3,752,816
CERTAIN 3-SUBSTITUTED-PYRIDO[3,2-d]
PYRIMIDINE 2,4-(1H,3H)-DIONES
Anson R. Cooke, Hatboro, Pa., and Richard L. Jacobs, Perrysburg, and Ell Dee Compton, Toledo, Ohio, assignors to The Sherwin-Williams Company
No Drawing. Continuation-in-part of abandoned applications Ser. No. 740,089 and Ser. No. 740,047, both June 26, 1968. This application June 10, 1969, Ser. No. 832,026
Int. Cl. C07d 57/20
U.S. Cl. 260—256.4 F     12 Claims

ABSTRACT OF THE DISCLOSURE

A method for controlling plant growth and compounds used in such method. The method includes the step of applying a composition comprising substituted pyrido [3,2-d]pyrimidine-2,4(1H,3H)-diones as herein described to the locus to be protected.

As new compositions of matter, 3-substituted-pyrido [3,2-d]pyrimidine-2,4(1H,3H)-diones, where the 3-substituent is a member of the group consisting of alkyl groups having from 2 to 8 carbon atoms, dimethoxyethyl, aralkyl groups such as benzyl, chlorosubstituted benzyl, and lower alkyl and methoxy substituted benzyl, cycloalkyl groups having from 3 to 8 carbon atoms, pyridyl substituted alkyl groups having from 1 to 2 carbon atoms, alkenyl groups having not more than 8 carbon atoms, tetrahydrofurfuryl, aryl, pyrrolidino, piperidino, homopiperidino, and septamethyleneimino, and 1,3-disubstituted analogues.

This is a continuation-in-part of application Ser. No. 740,089 now abandoned, and of application Ser. No. 740,-047 now abandoned, both June 26, 1968.

BACKGROUND OF THE INVENTION

This invention relates to a method for controlling plant growth, and to new compounds used in such method which have been found to have utility as plant growth regulators, total herbicides, selective weed killers, and defoliating agents.

In recent years increased crop yields have been made possible by the development and use of chemicals which are specifically toxic to weeds, yet do not damage crops around which they are applied. In general, the currently available chemicals which are most desired for their selectivity and as total herbicides are sufficiently expensive that expense is a significant factor in their use. Therefore, new compounds and inexepnsive methods for producing such compounds are constantly being sought.

In addition, while many compounds presently on the market are effective to control the growth of certain species of weeds, they are ineffective against others. Thus new herbicides which have broad spectrum effectiveness against a wide variety of weeds are continually being sought. A family of compounds which has been found particularly effective is substituted pyrido[3,2-d)pyrimidine-2,4(1H, 3H)-diones of the type described herein.

An object of the invention is a method for controlling weeds.

Another object of the invention is the provision of a new family of compounds useful as broad spectrum herbicides.

Other objects and advantages of this invention will be apparent from the description to follow:

SUMMARY OF THE INVENTION

The compositions of the invention comprise compounds of the formula

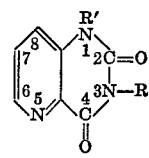

wherein R and R' are always dissimilar, wherein R is a member of the group consisting of alkyl groups having from 2 to 8 carbon atoms, dimethoxyethyl, aralkyl groups where the alkyl portion has from 1 to 2 carbon atoms and the aromatic portion is phenyl or a substituted phenyl having 1 or 2 methyl, methoxy or chlorine substituents on the benzene ring, cycloalkyl groups having from 3 to 8 carbon atoms, pyridyl substituted alkyl groups having from 1 to 2 carbon atoms, alkenyl groups having not more than 8 carbon atoms, tetrahydrofurfuryl, pyrrolidino, piperidino, homopiperidino, septamethyleneimino, and phenyl, and wherein R' is hydrogen or a lower alkyl group having from 1 to 4 carbon atoms. These compounds are named as 3 - substituted-pyrido[3,2-d]pyrimidine-2,4 (1H,3H) - diones, and 1,3-disubstituted-pyrido[3,2-d]pyrimidine-2,(1H,3H)-diones.

The method of the invention comprises applying an effective quantity of at least one of the above compounds to the locus to be protected.

Most of the 3-substituted-pyrido[3,2-d]pyrimidine-2,4 (1H,3H) - diones of the invention can be produced by reacting (1) a compound having the formula

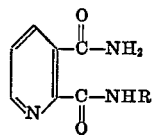

wherein R is a member of the group consisting of alkyl groups having from 2 to 8 carbon atoms, dimethoxyethyl, aralkyl groups where the alkyl portion has from 1 to 2 carbon atoms and the aromatic portion is phenyl or a substituted phenyl having 1 or 2 methyl, methoxy or chlorine substituents on the benzene ring, cycloalkyl groups having from 3 to 8 carbon atoms, pyridyl substituted alkyl groups having from 1 to 2 carbon atoms, alkenyl groups having not more than 8 carbon atoms, and tetrahydrofurfuryl, with (2) sodium hypochlorite, the reaction being carried out in the presence of sodium hydroxide and a suitable solvent, preferably at elevated temperatures.

The reaction is illustrated generally below, R having the meaning assigned in explaining the immediately preceding formula.

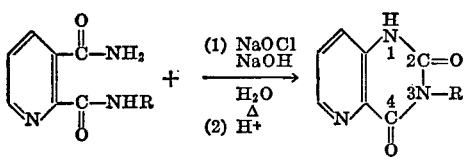

The reaction is self-generating and will proceed in the absence of heat, but is accelerated by heating the reaction mixture. For that reason it is preferable to heat the reaction mixture to a temperature from about 50°[1] to the boiling temperature thereof, most desirably about 60–80°, and hold it at such temperature for about ½ hour. Thereafter the mixture is cooled to room temperature and neutralized with acid at which time the reaction product precipitates.

The corresponding 1,3-disubstituted compounds can be produced by alkylating the 3-substituted-pyrido[3,2-d]pyrimidine-2,4-(1H,3H)-diones produced as above; this can be done by reacting the dione with an alkyl halide in the presence of sodium hydride and a solvent such as tetrahydrofuran, dimethylformamide or dimethylsulfoxide.

This invention can be more clearly understood by reference to the following examples. The examples, however, are not intended to be limitative.

EXAMPLE I

Preparation of 3-sec-butyl-pyrido[3,2-d]pyrimidine-2,4(1H,3H)-dione

A 22 l. flask equipped with a stirrer and a thermometer, and surrounded by a heating mantle was charged with 6 l. water, 369 g. sodium hydroxide and 11.65 l. aqueous solution containing 745 g. NaOCl. Stirring was commenced, and was continued throughout the reaction. When this charging was complete, the temperature of the charge was 34°; then 2.2 kg. $N^2$-sec-butyl-2,3-pyridinedicarboxamide was added to the NaOCl-NaOH solution in the flask. After the pyridinedicarboxamide dissolved, the temperature of the reaction mixture was 33°; the reaction mixture was then heated for a total of about 50 minutes. The temperature after 20 minutes of heating was 60°, after 50 minutes of heating 67°. The heating mantle was then removed, and the flask was immersed in an ice bath for about 1 hour 45 minutes; the final temperature of the reaction product was 17°. Approximately a 75 liter receiving vessel was then charged with 600 ml. glacial acetic acid, and immersed in an ice bath. The reaction product was then added gradually to the acetic acid in the receiver, with stirring. The rate of addition of the reaction product was controlled so that the temperature of the liquid in the receiver remained within the range of 10 to 15°. The pH of the liquid in the receiver was monitored, and additions of glacial acetic acid were made, as required, to prevent the pH thereof from rising above about 6. The 3-sec-butyl-pyrido[3,2-d]pyrimidine-2,4(1H,3H)-dione product, which had separated as an off-white to cream precipitate, was separated from the mother liquor by filtration, using a Büchner funnel. The final product was washed with tap water and dried in a circulating air oven in which the air was maintained at a temperature within the range of 80 to 100°. The total recovery of dried product amounted to 2.45 kg., or 95 percent of theory. It was determined by nuclear magnetic resonance analysis that the product was 87 percent, plus or minus 4 percent, 3-sec-butyl-pyrido[3,2-d]pyrimidine-2,4(1H,3H)-dione. The remainder of the product was 3-sec-butyl-pyrido[2,3-d]pyrimidine-2,4(1H,3H)-dione. The presence of the [2,3-d]-family compound is attributable to an impurity in the amide starting material.

EXAMPLE II

Preparation of 3-isopropyl-pyrido[3,2-d]pyrimidine-2,4(1H,3H)-dione

A 22 l. flask equipped with a stirrer and a thermometer, and surrounded by a heating mantle was charged with 8 l. water, 398 g. sodium hydroxide and 9.5 l. aqueous solution containing 595 g. NaOCl. Stirring was commenced, and was continued throughout the reaction. When this charging was complete, the temperature of the charge was 31°; then 1.76 kg. $N^2$-isopropyl-2,3-pyridinedicarboxamide was added to the NaOCl-NaOH solution in the flask. After the pyridinedicarboxamide dissolved, the temperature of the reaction mixture was 33°; the reaction mixture was then heated for a total of about 55 minutes. The temperature after 10 minutes of heating was 40°, after 15 minutes 44°, after 21 minutes 52°, after 25 minutes 60°, and after 55 minutes 63°. The heating mantle was then removed, and the flask was immersed in an ice bath for about 2 hours 50 minutes; the final temperature of the reaction product was 10°. The reaction mixture was then acidified by making a gradual addition of glacial acetic acid to a pH of 6. The rate of addition of acetic acid was controlled so that the temperature of the reaction mixture in the flask remained within the range of 10 to 15°. The 3-isopropyl-pyrido[3,2-d]pyrimidine-2,4(1H,3H)-dione product, which had separated as an off-white to cream precipitate, was separated from the mother liquor by filtration, using a Büchner funnel. The final product was washed with tap water and dried in a circulating air oven in which the air was maintained at a temperature within the range of 80 to 100°.

The total recovery of dry product, melting point 238–244°, amounted to 1.48 kg., or 89.8 percent of theory. It was determined by nuclear magnetic resonance analysis that the product was 98 percent, plus or minus 2 percent, 3-isopropyl-pyrido[3,2-d]pyrimidine - 2,4(1H,3H)-dione. The remainder of the product, if any, was 3-isopropyl-pyrido[2,3-d]pyrimidine-2,4(1H,3H)-dione. The presence of the [2,3-d]-family compound, if any, is attributable to an impurity in the amide starting material.

It will be noted that, in the procedure described in Example I, the reaction product was added to glacial acetic acid while, in the procedure described in Example II, glacial acetic acid was added to the reaction product. It has been found that, in some instances, the Example II procedure causes the dione product to appear as a sticky solid; this causes difficulty in "work-up." Such difficulty is minimized, or eliminated altogether when the Example I technique is used; this procedure is, therefore, preferred.

EXAMPLES III THROUGH XXV

Numerous other compounds of the invention have been produced by the above described method. Information concerning starting materials, batch sizes, final product and yield for representative ones of such preparations is presented in Table I, which follows.

---

[1] All temperatures reported herein and in the attached claims are in degrees centigrade unless otherwise specified.

TABLE I

| Example | Starting amide Name | Grams | Metal hypohalite Name or formula | Grams | Ml. solution | Base Name or formula | Grams | Added water, ml. |
|---|---|---|---|---|---|---|---|---|
| III | N²-cyclohexyl-2,3-pyridine dicarboxamide | 1,985 | NaOCl | 580 | 9,500 | NaOH | 396 | 8,000 |
| IV | N²-ethyl-2,3-pyridine dicarboxamide | 10 | NaOCl | 3.9 | 50.2 | NaOH | 2.06 | 25 |
| V | N²-propyl-2,3-pyridine dicarboxamide | 41.4 | NaOCl | 14.9 | 192 | NaOH | 8.3 | 300 |
| VI | N²-allyl-2,3-pyridine dicarboxamide | 30.8 | NaOCl | 11.2 | 146 | NaOH | 6.1 | 230 |
| VII | N²-cyclopropyl-2,3-pyridine dicarboxamide | 14 | NaOCl | 5.2 | 68 | NaOH | 3 | 120 |
| VIII | N²-butyl-2,3-pyridine dicarboxamide | 22.1 | NaOCl | 7.5 | 92.3 | NaOH | 4.1 | 350 |
| IX | N²-(2-ethylhexyl)-2,3-pyridine dicarboxamide | 41.6 | NaOCl | 11.2 | 145 | NaOH | 6.1 | 230 |
| X | N²-cyclooctyl-2,3-pyridine dicarboxamide | 5 | NaOCl | 2.7 | 34.8 | NaOH | 1.49 | 80 |
| XI | N²-benzyl-2,3-pyridine dicarboxamide | 51.1 | NaOCl | 14.9 | 194 | NaOH | 8.3 | 300 |
| XII | N²-cyclopentyl-2,3-pyridine dicarboxamide | 46.6 | NaOCl | 16 | 260 | NaOH | 16 | 700 |
| XIII | N²-cycloheptyl-2,3-pyridine dicarboxamide | 46.0 | NaOCl | 14.9 | 250 | NaOH | 14 | 800 |
| XIV | N²-α-phenethyl-2,3-pyridine dicarboxamide | 25.3 | NaOCl | 14.9 | 240 | NaOH | 8 | 500 |
| XV | N²-(2,2-dimethoxyethyl)-2,3-pyridine dicarboxamide | 44.3 | NaOCl | 14.9 | 250 | NaOH | 16 | 700 |
| XVI | N²-propargyl-2,3-pyridine dicarboxamide | 20.5 | NaOCl | 7.5 | 97 | NaOH | 4.1 | 150 |
| XVII | N²-(2-chlorobenzyl)-2,3-pyridine dicarboxamid | 29 | NaCOl | 14.9 | 197 | NaOH | 8 | 500 |
| XVIII | N²-(3-chlorobenzyl)-2,3-pyridine dicarboxamide | 56.2 | NaOCl | 22.4 | 300 | NaOH | 16 | 1,200 |
| XIX | N²-(4-chlorobenzyl)-2,3-pyridine dicarboxamide | 33 | NaOCl | 8.3 | 110 | NaOH | 9 | 600 |
| XX | N²-(3,4-dichlorobenzyl)-2,3-pyridine dicarboxamide | 39.7 | NaOCl | 14.9 | 198 | NaOH | 10 | 800 |
| XXI | N²-(2,4-dichlorobenzyl)-2,3-pyriine dicarboxamide | 36.8 | NaOCl | 14.9 | 250 | NaOH | 8 | 800 |
| XXII | N²-(4-methoxybenzyl)-2,3-pyridine dicarboxamide | 23.8 | NaOCl | 6.8 | 90 | NaOH | 8 | 500 |
| XXIII | N²-(2-pyridylethyl)-2,3-pyridine dicarboxamide | 42 | NaOCl | 17.1 | 290 | NaOH | 12 | 800 |
| XXIV | N²-(3-pyridylmethyl)-2,3-pyridine dicarboxamide | 51.3 | NaOCl | 15.6 | 210 | NaOH | 16 | 1,000 |
| XXV | N²-tetrahydrofurfuryl-2,3-pyridine dicarboxamide | 35.4 | NaOCl | 14.9 | 250 | NaOH | 10 | 600 |

FINAL PRODUCT

| Example | Name | Yield, grams |
|---|---|---|
| III | 3-cyclohexyl-pyrido[3,2-d]pyrimidine-2,4(1H,3H)-dione. | 1,925 |
| IV | 3-ethyl-pyrido[3,2-d]pyrimidine-2,4(1H,3H)-dione | 6.3 |
| V | 3-n-propyl[3,2-d]pyrimidine-2,4(1H,3H)-dione | 25 |
| VI | 3-allyl-pyrido[3,2-d]pyrimidine-2,4(1H,3H)-dione | 10 |
| VII | 3-cyclopropyl-pyrido[3,2-d]pyrimidine-2,4(1H,3H)-dione. | 2.9 |
| VIII | 3-n-butyl-pyrido[3,2-d]pyrimidine-2,4(1H,3H)-dione. | 16.3 |
| IX | 3-(2-ethylhexyl)-pyrido[3,2-d]pyrimidine-2,4(1H,3H)-dione. | 36.7 |
| X | 3-cyclooctyl-pyrido[3,2-d]pyrimidine-2,4(1H,3H)-dione. | 4.5 |
| XI | 3-benzyl-pyrido[3,2-d]pyrimidine-2,4(1H,3H)-dione. | 22.6 |
| XII | 3-cyclopentyl-pyrido[3,2-d]pyrimidine-2,4(1H,3H)-dione. | 89.3 |
| XIII | 3-cycloheptyl-pyrido[3,2-d]pyrimidine-2,4(1H,3H)-dione. | 99.4 |
| XIV | 3-α phenethyl-pyrido[3,2-d]pyrimidine-2,4(1H,3H)-dione. | 77.0 |
| XV | 3-(2,2-dimethoxyethyl)-pyrido[3,2-d]pyrimidine-2,4(1H,3H)-dione. | 48.0 |
| XVI | 3-propargyl-pyrido[3,2-d]pyrimidine-2,4(1H,3H)-dione. | 0.5 |
| XVII | 3-(2-chlorobenzyl)-pyrido[3,2-d]pyrimidine-2,4(1H,3H)-dione. | 38.8 |
| XVIII | 3-(3-chlorobenzyl)-pyrido[3,2-d]pyrimidine-2,4(1H,3H)-dione. | 29 |
| XIX | 3-(4-chlorobenzyl)-pyrido[3,2-d]pyrimidine-2,4(1H,3H)-dione. | 21.7 |
| XX | 3-(3,4-dichlorobenzyl)-pyrido[3,2-d]pyrimidine-2,4(1H,3H)-dione. | 24 |
| XXI | 3-(2,4-dichlorobenzyl)-pyrido[3,2-d]pyrimidine-2,4(1H,3H)-dione. | 48.8 |
| XXII | 3-(4-methoxybenzyl)-pyrido[3,2-d]pyrimidine-2,4(1H,3H)-dione. | 44.5 |
| XXIII | 3-[2-(2-pyridylethyl)]-pyrido[3,2-d]pyrimidine-2,4(1H,3H)-dione. | 64.2 |
| XXIV | 3-(3-pyridylmethyl)-pyrido[3,2-d[pyrimidine-2,4(1H,3H)-dione. | 41.0 |
| XXV | 3-tetrahydrofurfuryl-pyrido[3,2-d]pyrimidine-2,4(1H,3H)-dione. | 68.5 |

Time-temperature readings for each of the reactions represented by the examples set forth in Table I are presented in Table II below. Zero time is when the amide is added to the reaction mixture.

TABLE II

| Example | Time, minutes: seconds | Temperature, degrees |
|---|---|---|
| III | 0:00 | 23 |
| | 20:00 | 36 |
| | 32:00 | 48 |
| | 37:00 | 55 |
| | 40:00 | 60 |
| | 43:00 | 64 |
| | 55:00 | 63 |
| | 70:00 | 60 |
| IV | 0:00 | 11 |
| | 0:45 | 15 |
| | 1:30 | 18 |
| | 2:30 | 39 |
| | 4:00 | 60 |
| | 5:30 | 78 |
| | 7:00 | 79 |
| | 12:00 | 76 |
| | 36:00 | 62 |
| | 47:00 | 16 |
| V | 0:00 | 17 |
| | 2:00 | 24 |
| | 4:00 | 42 |
| | 5:00 | 55 |
| | 8:00 | 69 |
| | 10:00 | 68 |
| | 12:00 | 65 |
| | 25:00 | 52 |
| VI | 0:00 | 15 |
| | 1:00 | 22 |
| | 3:00 | 50 |
| | 4:00 | 75 |
| | 5:00 | 80 |
| | 19:00 | 86 |
| | 35:00 | 86 |
| VII | 0:00 | 15 |
| | 1:00 | 30 |
| | 2:00 | 31 |
| | 3:00 | 50 |
| | 4:00 | 70 |
| | 7:00 | 80 |
| | 17:00 | 75 |
| | 22:00 | 71 |
| | 37:00 | 60 |
| VIII | 0:00 | 24 |
| | 3:00 | 25 |
| | 4:00 | 26 |
| | 8:00 | 50 |
| | 11:00 | 80 |
| | 15:00 | 85 |
| | 25:00 | 91 |
| | 40:00 | 91 |
| | 55:00 | 23 |
| IX | 0:00 | 18 |
| | 5:00 | 20 |
| | 6:00 | 41 |
| | 7:00 | 80 |
| | 9:00 | 84 |
| | 25:00 | 86 |
| | 37:00 | 84 |
| X | 0:00 | 19 |
| | 7:00 | 28.5 |
| | 10:00 | 62.5 |
| | 12.00 | 72 |
| | 15:00 | 75 |
| | 16:00 | 79 |
| | 17:00 | 84 |
| | 30:00 | 89 |
| XI | 0:00 | 17 |
| | 2:00 | 22.5 |
| | 3:00 | 23 |
| | 4:00 | 38 |
| | 5:00 | 55 |
| | 6:00 | 70 |
| | 8:00 | 80 |
| | 15:00 | 80 |
| | 30:00 | 61 |
| | 35:00 | 58 |
| XII | 0:000 | 16 |
| | 5:00 | 21 |
| | 20:00 | 40 |
| | 30:00 | 60 |
| | 40:00 | 69 |
| | 60:00 | 62 |

TABLE II—Continued

| Example | Time, minutes: seconds | Temperature, degrees |
|---|---|---|
| XIII | 0:00 | 16 |
|  | 15:00 | 21 |
|  | 30:00 | 45 |
|  | 34:00 | 51 |
|  | 40:00 | 60 |
|  | 70:00 | 64 |
| XIV | 0:00 | 20 |
|  | 3:00 | 21 |
|  | 13:00 | 43 |
|  | 18:00 | 53 |
|  | 27:00 | 67 |
|  | 43:00 | 65 |
|  | 48:00 | 60 |
| XV | 0:00 | 20 |
|  | 1:00 | 25 |
|  | 10:00 | 30 |
|  | 25:00 | 50 |
|  | 30:00 | 60 |
|  | 45:00 | 67 |
|  | 60:00 | 67 |
| XVI | 0:00 | 15 |
|  | 18:00 | 19 |
|  | 31:00 | 36 |
|  | 44:00 | 50 |
|  | 54:00 | 70 |
|  | 59:00 | 62 |
| XVII | 0:00 | 18 |
|  | 17:00 | 44 |
|  | 20:00 | 57 |
|  | 25:00 | 63 |
|  | 40:00 | 77 |
|  | 45:00 | 76 |
|  | 60:00 | 65 |
| XVIII | 0:00 | 12 |
|  | 9:00 | 15 |
|  | 37:00 | 35 |
|  | 49:00 | 50 |
|  | 65:00 | 70 |
|  | 89:00 | 69 |
| XIX | 0:00 | 16 |
|  | 5:00 | 19 |
|  | 15:00 | 42 |
|  | 25:00 | 60 |
|  | 35:00 | 68 |
|  | 45:00 | 70 |
|  | 50:00 | 57 |
| XX | 0:00 | 13 |
|  | 5:00 | 15 |
|  | 20:00 | 19 |
|  | 30:00 | 52 |
|  | 40:00 | 61 |
|  | 72:00 | 67 |
|  | 75:00 | 70 |
| XXI | 0:00 | 12 |
|  | 25:00 | 14 |
|  | 50:00 | 19 |
|  | 85:00 | 22 |
|  | 145:00 | 58 |
|  | 165:00 | 73 |
|  | 190:00 | 70 |
|  | 205:00 | 40 |
| XXII | 0:00 | 17 |
|  | 7:00 | 30 |
|  | 22:00 | 63 |
|  | 27:00 | 66 |
|  | 52:00 | 62 |
| XXIII | 0:00 | 10 |
|  | 2:00 | 15 |
|  | 20:00 | 50 |
|  | 35:00 | 70 |
|  | 40:00 | 65 |
| XXIV | 0:00 | 15 |
|  | 1:00 | 20 |
|  | 5:00 | 25 |
|  | 15:00 | 45 |
|  | 18:00 | 50 |
|  | 28:00 | 70 |
|  | 30:00 | 72 |
|  | 35:00 | 70 |
|  | 50:00 | 60 |
| XXV | 0:00 | 15 |
|  | 5:00 | 20 |
|  | 15:00 | 40 |
|  | 18:00 | 50 |
|  | 23:00 | 60 |
|  | 30:00 | 70 |
|  | 50:00 | 62 |

The structures of the final compounds of Examples III through XXV were confirmed by elemental analysis, and by infrared and nuclear magnetic resonance-spectra.

The production of 3-substituted-pyrido[3,2-d]pyrimidine-2,4(1H,3H)-diones of this invention where the 3-substituent is an alkyleneimine or aryl is discussed subsequently herein. The other 3-substituted-pyrido [3,2-d]pyrimidine-2,4(1H,3H)-diones of this invention can be made by the procedures described in Examples I and II, above, substituting the appropriate dicarboxamide for the $N^2$-sec-butyl-2,3-pyridinedicarboxamide and the $N^2$-isopropyl-2,3-pyridinedicarboxamide starting materials.

EXAMPLE XXVI

Preparation of 3-isopropyl-1-methyl-pyrido[3,2-d] pyrimidine-2,4(1H,3H)-dione

A 250 ml. 3-necked flask partially immersed in an ice bath and equipped with a stirrer, condenser, thermometer, addition funnel, gas inlet and outlet tubes, and nitrogen atmosphere system was assembled. The nitrogen was turned on, and 1.3 g. NaH (washed in petroleum ether) and 50 ml. dimethylformamide was charged into the flask. Agitation was begun and continued throughout the reaction. The temperature at this point was 25°. Twenty minutes later the temperature had fallen to 18°. At this time the nitrogen was turned off, and the addition of 10.3 g. 3 - isopropyl - pyrido[3,2-d]pyrimidine-2,4(1H,3H)-dione dissolved in 110 ml. of dimethylformamide, was begun. A light gray slurry began to form, turning to brown during the 20 minutes it took to complete the charging of the dione. After completion of the charging of the dione, 2.5 g. $CH_3Cl$ was introduced into the reaction mixture at the rate of 0.5 g. per minute. A hazy light brown solution formed, turning to reddish brown as the addition progressed. The temperature at this point was 21°. Another 2.5 g. of $CH_3Cl$ was then charged at the rate of 0.5 g./minute. Solids precipitated, forming a red orange colored slurry. The temperature at this point was 26° and the pH was between 8 and 9. The slurry was stirred for an additional three hours. The total elapsed time at this point was 9 hours.

The slurry was set aside overnight. Then it was quenched into 1120 ml. of tap water (a 7 to 1 ratio of water to dimethylformamide) forming a clear light tan solution. The solution was stirred for 1 hour, then the pH was adjusted to 5 with dilute hydrochloric acid. No solids were apparent. Then the solution was partially evaporated and the precipitate filtered and dried. The filtrate was evaporated still more and a second crop filtered and dried.

The total yield was 10.1 g. or 91.8 percent of theory. Infrared analysis was in agreement with the structure for 3 - isopropyl - 1 - methyl-pyrido[3,2-d]pyrimidine-2,4-(1H,3H)-dione.

The other 1,3-disubstituted-pyrido[3,2-d]pyrimidine-2,4(1H,3H)-diones of this invention can be made by the procedure described in Example XXVI above, substituting the appropriate alkylating agent or 3-substituted-pyrido-[3,2-d]pyrimidine-2,4(1H,3H)-dione for the starting materials used therein.

DISCUSSION OF THE REACTANTS

The best yields are obtained when one equivalent of base and one equivalent of hypohalite are used for each mole of the amide. Satisfactory results, however, have been achieved when as much as two equivalents of the hypohalite were used per mole of the amide.

While the method above described contemplates the use of alkali and alkaline earth metal hydroxides and alkali and alkaline earth metal hypohalites, sodium hydroxide and sodium hypohalite are preferred for economic reasons only. The other metal hydroxides and metal hypohalites are perfectly satisfactory but the cost thereof is much greater.

The metal hypohalite may be prepared by reacting chlorine or bromine with a water solution of an alkali metal or alkaline earth metal hydroxide, preferably sodium hydroxide. For example, a 1 N. sodium hypochlorite solution can be prepared by reacting 79.98 g. NaOH with 70.9 g. chlorine ($Cl_2$) in sufficient water to make one liter.

It can be appreciated that one equivalent of bromine (Br$_2$) can be substituted for chlorine to produce a sodium hypobromite solution; and in the same manner, 1 equivalent of an alkali or alkaline earth metal hydroxide can be substituted for the sodium hydroxide to produce a different metal hypohalite.

Water is the preferred solvent medium for the reaction for economic reasons. Other solvents could be used alone or mixed with water if they did not interfere with the course of the reaction or react with the final products. The exact amount of water or other solvent to be used is not critical.

DISCUSSION OF THE REACTION METHOD

In carrying out the process described in Example I or Example II for producing the compositions of the invention the metal hypohalite should first be admixed with the base, and then the amide should be added thereto. If the components are not admixed in this manner, there is a tendency for the amide to hydrolyze to the corresponding acid resulting in a lower yield.

The temperature at which the reaction is conducted can range from 0° to 100° with 60–80° being the most preferred. The reaction mixture should be held at the desired temperature for about ½ hour or until a negative test for hypohalite indicates the completion of the reaction.

At the end of the reaction, the reaction mixture is cooled to room temperature and neutralized with acid to a pH in the range of 10 to 4 to precipitate the product which can then be collected by filtration, washed and dried. The preferred pH range is from 5 to 6. Any acid can be used for the pH adjustment but mineral acids and simple organic acids such as acetic acid are most preferred for economic reasons.

The N-substituted 2,3-pyridinedicarboxamides which constitute a family of starting materials in producing the compounds of this invention can be made from corresponding 2,3-pyridinedicarboxylic acid according to the method described in Example A below. The preparation of N$^2$-isopropyl-2,3-pyridinedicarboxamide is used as an example.

Example A

A 2-liter, 3-necked flask equipped with a stirrer and a thermometer, and partially immersed in an oil bath was charged with 400 g. 2,3-pyridinedicarboxylic acid, 400 g. acetamide, and 400 ml. acetic anhydride. Agitation was begun and continued throughout the reaction. The reaction mixture was then heated rapidly to a temperature of 136° and held at that temperature for 2 hours. During this period the acetic acid which was produced was distilled off. At the end of this time, the mixture was cooled, the solids removed by filtration, and the filtrate set aside. The solids were washed with cold methanol, dried, and weighed. The yield was 251.6 g. light tan material having a melting point of 239–240°. The filtrate which had been set aside was concentrated in vacuo, and a precipitate of 9.2 g. medium brown material having a melting point of 239–240° was recovered by filtration. The total yield was 260.8 g. 2,3-pyridinedicarboximide. The 2,3-pyridinedicarboximide was used to prepare N$^2$-isopropyl-2,3-pyridinedicarboxamide, in the following manner.

A 500 ml. flask equipped with a stirrer, condenser, thermometer, bubbler, and addition funnel, and partially immersed in an ice bath, was charged with 29.6 g. 2,3-pyridinedicarboximide and 150 ml. 2-propanol. Agitation of the flask contents was begun and continued throughout the duration of the reaction. An addition of 11.8 g. isopropylamine was then commenced and charged over a 2 minute period. After the charging, the reaction mixture was stirred for an additional 2 hours and 10 minutes, during which time the temperature of the reaction mixture reached a high of 34°. At the end of this time, the thick slurry which had formed was cooled to about 3°, the solids were removed by filtration, and the filtrate was set aside.

The solids were then washed with cold 2-propanol and dried. The yield was 33.8 g. product which had a melting point of 139–140°, and was identified by Infrared Spectroscopy as N$^2$-isopropyl-2,3-pyridinedicarboxamide.

The other amide starting materials used to produce the compositions of this invention can be made in substantially the same manner, substituting the required amine for the isopropylamine employed in the foregoing procedure. In some instances a mixture of isomers is produced. If so, separation can be accomplished either by preferential precipitation or by column chromatography. Not all of the compounds of this invention can be prepared in the manner described in Examples I–XXV. For example, 3-substituted-pyrido[3,2-d]pyrimidine - 2,4(1H,3H)-diones where the 3-substituent is an aryl group or an alkyleneimino group cannot be produced in the aforedescribed manner, so far as is known. They can be produced by other methods, however. The alkyleneimino substituted compounds can be produced by the reactions illustrated below:

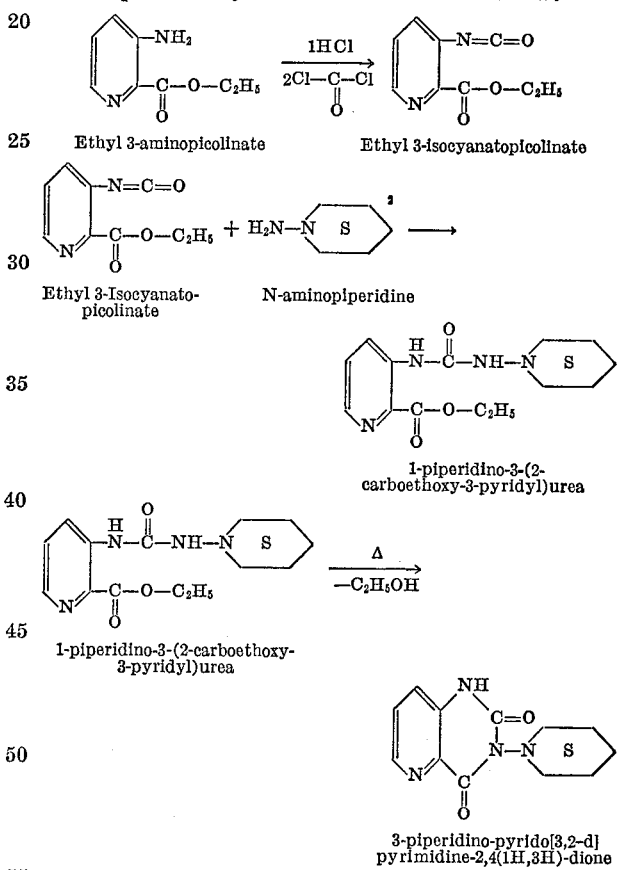

[2] The symbol $$-N\underset{\underset{CH_2-CH_2}{}}{\overset{\overset{CH_2-CH_2}{}}{}}CH_2$$

is used herein, and in the appended claims, to mean

The following example illustrates the preparation of 3-piperidino - pyrido[3,2-d]pyrimidine-2,4(1H,3H)-dione.

EXAMPLE XXVII

Preparation of 3-piperidino-pyrido[3,2-d]pyrimidine-2,4(1H,3H)-dione

Preparation of ethyl 3 - aminopicolinate.—Ethyl-3-aminopicolinate was produced from 49 g. 3-aminopicolinic acid and 80 ml. sulfuric acid [3] dissolved in 200 ml. anhydrous ethanol. The reagents were combined and heated ---
[3] 98 percent, by weight.

under reflux for 16 hours; and the reaction mixture was then poured onto 3 l. crushed ice and neutralized with solid potassium bicarbonate. A solid precipitate which formed was separated from the water-ethanol-sulfuric acid phase by filtration, and was extracted with 200 ml. hot acetone. The water-ethanol-sulfuric acid fraction was extracted 6 times with 100 ml. portions of methylene chloride. The methylene chloride and acetone extracts were combined, dried with anhydrous magnesium sulfate, and concentrated under reduced pressure. Evaporation of the methylene chloride and acetone to leave a volume of about 50 ml. reaction mixture caused precipitation of solids which were recovered by filtration, recrystallized from 300 ml. benzene and identified by infrared spectroscopy as ethyl 3-aminopicolinate, melting point 126–129°. Found and calculated elemental analyses for another batch of ethyl 3-aminopicolinate, which batch was found by infrared spectroscopy and melting point to be identical with that described above, were as follows:

Theory (percent): C, 57.82; H, 6.07; N, 16.86. Found (percent): 57.87; H, 6.19; N, 16.89.

Preparation of ethyl 3-isocyanatopicolinate.—Ethyl 3-isocyanatopicolinate was produced from 3.3 g. ethyl 3-aminopicolinate and phosgene. The ethyl 3-aminopicolinate produced as described above was first dissolved in dry toluene, and the resulting solution was saturated, with stirring, with dry hydrogen chloride gas. About a 13° temperature rise indicated the occurrence of an exothermic reaction. After about 2 hours a whitish precipitate which was the hydrochloride of ethyl 3-aminopicolinate began to appear. Reaction was continued, with stirring, for a total of approximately 8 hours. The toluene slurry was heated, under reflux, and saturated rapidly with an excess of phosgene. Phosgenation was continued for a total of 6 hours, during which time the reaction mixture was kept saturated with phosgene. After phosgenation, the toluene solvent was distilled from the reaction mixture, leaving a tan oil which was identified by infrared spectroscopy, by nuclear magnetic resonance, and by elemental analysis, as ethyl 3-isocyanatopicolinate.

Preparation of 1-piperidino-3(2-carboethoxy-3-pyridyl) urea.—The ethyl 3-isocyanatopicolinate produced as described above was dissolved in 50 ml. benzene and approximately a 4 g. portion of N-aminopiperidine was added dropwise to the resulting solution. A slight temperature rise indicated exothermic reaction. The reaction mixture was refluxed for 4 hours and was then acidified with acetic acid until a white precipitate formed. The white product, melting point 182–183°, was identified by infrared spectroscopy as 1-piperidino-3-(2-carboethoxy-3-pyridyl) urea.

Preparation of 3 - piperidino-pyrido[3,2-d]pyrimidine-2,4(1H,3H)-dione.—The 1 - piperidino-3-(2-carboethoxy-3-pyridyl) urea produced as described above was dissolved in 40 ml. solution of equal parts by volume of 37% hydrochloric acid and ethyl alcohol and heated under reflux for 5 hours. The solvent was then evaporated, leaving a brown oil, which was allowed to stand overnight, during which standing a solid precipitated, 0.3 g., melting point 265–270°. The solid was identified by infrared spectroscopy as the hydrochloride salt of 3-piperidino-[3,2-d]pyrimidine-2,4(1H,3H)-dione. The hydrochloride salt was dissolved in water acidified with hydrochloric acid to a pH of 2, and the resulting solution was neutralized to a pH of 8 with potassium bicarbonate to cause reprecipitation of the final product, melting point 290–300°, identified by infrared spectroscopy as 3-piperidino-pyrido[3,2-d]pyrimidine-2,4(1H,3H)-dione. After recrystallization from ethyl alcohol, the final product had a melting point of 301–303°, and was white and crystalline. The elemental analysis and theory, for purposes of comparison, were as follows:

Theory (percent): C, 58.53; H, 5.73; N, 22.75. Found (percent): C, 58.36; H, 5.83; N, 22.55.

The other 3-methyleneimino-pyrido[3,2-d]pyrimidine-2,4(1H,3H)-diones of this invention can be produced by the method described in Example XXVII above. It is necessary only to substitute an equivalent amount of the appropriate amine, i.e., N-aminopyrrolidine, N-aminohomopiperidine, or N-aminoseptamethyleneimine for the N-aminopiperidine used in the example.

The 3 - aryl - pyrido[3,2 - d]pyrimidine-2,4(1H,3H)-diones of this invention can be produced by the reaction illustrated below:

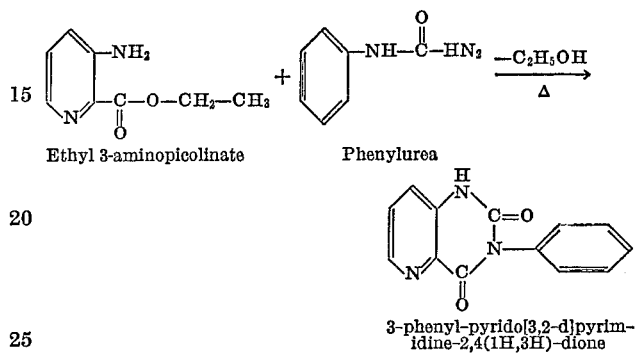

3-phenyl-pyrido[3,2-d]pyrimidine-2,4(1H,3H)-dione

The following example illustrates the production of 3-phenyl - pyrido[3,2 - d]pyrimidine-2,4(1H,3H)-dione by reaction between phenylurea and ethyl 3-aminopicolinate.

EXAMPLE XXVIII

3 - phenyl - pyrido[3,2-d]pyrimidine-2,4(1H,3H)-dione was produced from 8.3 g. ethyl 3-aminopicolinate and 6.9 g. phenylurea plus an excess of about 3 g. phenylurea. A blended mixture of the ethyl 3-aminopicolinate and of the phenylurea was placed in a 50 ml. beaker, and the beaker was immersed in an oil bath. Time, in hours and minutes, and bath temperature are set forth in the following table, zero time being that at which the beaker was immersed in the bath:

| Time: | Temperature, degrees |
|---|---|
| 0:00 | 100 |
| 0:05 | 135 |
| 0:09 | 150 |
| 0:12 | 160 |
| 0:15 | 170 |
| 0:25 | 195 |
| 0:32 | 202 |
| 0:40 | 213 |
| 0:55 | 220 |
| 1:15 | 220 |

At the end of the 1 hour 15 minute heating period, the beaker contained a finely divided solid, and heating was discontinued. The crude product from this reaction, 8.8 g., was combined with crude 3-phenyl-pyrido[3,2-d] pyrimidine-2,4(1H,3H)-dione from other batches to provide a total of 17.3 g. crude. This material was dissolved in 150 ml. dimethyl sulfoxide at 100°, carbon treated and quenched into 1 l. water; tan colored solids which precipitated were recovered by filtration, and identified by infrared spectroscopy as 3-phenyl-pyrido[3,2-d]pyrimidine-2,4(1H,3H)-dione. The yield was 14.4 g. purified product.

Other 3 - aryl-substituted-pyrido[3,2-d]pyrimidine-2,4-(1H,3H)-diones can be produced by the procedure described above in Example XXVIII, merely by substituting for the phenylurea an equivalent amount of the appropriate aryl urea. Examples of known aryl ureas which can be so used include m-tolylurea, o-tolylurea, 5-chloro-o-tolylurea and p-tolylurea.

Reaction between the 3-aminopicolinic acid and phenyl isocyanate has also been utilized to produce 3-phenyl-pyrido[3,2-d]pyrimidine-2,4(1H,3H)-dione. The reaction proceeds readily if the phenyl isocyanate and the 3-aminopicolinic acid are merely heated under reflux and is illustrated by the following example.

EXAMPLE XXIX

Preparation of 3-phenyl-pyrido[3,2-d]pyrimidine-2,4-(1H,3H)-dione

Reaction between 12 g. phenyl isocyanate and 7 g. 3-aminopicolinic acid was utilized to produce 3-phenyl-pyrido[3,2-d]pyrimidine-2,4(1H,3H)-dione. The 3-aminopicolinic acid and the phenyl isocyanate were merely charged to an appropriate vessel, and heated under reflux for 1 hour. The reaction mixture was then cooled to 100° C.; a charge of 150 ml. 5 percent sodium hydroxide solution was then added to the reaction mixture; and the resulting mixture was stirred at a temperature of about 90° C. for approximately 1 hour and then cooled to room temperature. An addition of 100 ml. 10 percent sodium hydroxide solution was then made; the mixture was heated to 90°; and insoluble material was separated from the solution by filtration. The filtrate was acidified to a pH of 5.6 with acetic acid. Insoluble material, approximately 1½ g., was separated from the liquid by filtration, and recrystallized from methyl alcohol. The recrystallized material, 0.5 g., melting point in excess of 330°, was white in color and was identified by infrared spectoscopy as 3-phenylpyrido[3,2-d]pyrimidine-2,3(1H,3H)-dione.

The procedure described above in Example XXIX can also be used to produce other 3-aryl-substituted-pyrido-[3,2-d]pyrimidine-2,4(1H,3H)-diones, merely by substituting an equivalent amount of the appropriate isocyanate for the phenyl isocyanate used in the Example XXIX procedure. Examples of other aryl isocyanates which can be so substituted include: o-tolyl isocyanate, p-tolyl isocyanate, m-tolyl isocyanate, p-fluorophenyl isocyanate, α-naphthyl isocyanate, p-nitrophenyl isocyanate, m-nitrophenyl isocyanate, o-nitrophenyl isocyanate, p-chlorophenyl isocyanate, m-chlorophenyl isocyanate, o-chlorophenyl isocyanate, p-bromophenyl isocyanate.

The substituted pyrido[3,2-d]pyrimidine-2,4(1H,3H)-dione compounds have been found to display unexpectedly high levels of herbicidal activity and to be useful in controlling undesirable plants of both the monocotyledonous and the dioctyledonus species on either a postemergence or a preemergence base.

By "preemergence" is mean that the compound is applied to the soil prior to emergence of the weed species sought to be controlled. This term, as used herein, also means the application of the herbicidal compounds falling within the scope of this disclosure to areas wherein useful or desirable plants are either growing or have been sown, but where the undesirable plants sougth to be controlled have not as yet emerged.

By the term "postemergence" is meant that the compound is applied to the plant sought to be controlled after it has emerged from the soil surface. This term is also used to describe the application of herbicidally active compounds to soil surface in and around growing plants sought to be controlled for purposes of effecting root absorption by the undesirable plant species.

Especially active are the compounds where the 1-substituent is hydrogen and the 3-substituent is isopropyl, butyl, sec-butyl, cyclopentyl, cyclohexyl, cycloheptyl, cyclooctyl, piperidino or benzyl, and the 1-methyl analogues.

The method of the invention will be more clearly understood by reference to the following examples.

EXAMPLE XXX

The preemergence and postemergence herbicidal activity of 3-isopropyl-pyrido[3,2-d]pyrimidine-2,4(1H,3H)-dione achieved at various application rates is shown in Table III below.

In using the compound, seeds of the type of plants set forth in Table III were sown in fresh soil. In the preemergence test the soil was sprayed with a solution of the test compound immediately after the seeds were planted, and before any noticeable growth developed in the test area. The solution was about a 2 percent by weight solution of the compound in acetone and/or alcohol. The compound was applied at the rate of 16 pounds per acre of soil surface.

Approximately three weeks after spray application, the herbicidal activity of the compound was determined by visual observation of the treated area in comparison with untreated control areas. These observations are reported below in Table III wherein the average activity rating is reported as the percent control of plant growth.

In the postemergence test the soil and developing plants were sprayed about two weeks after the seeds were sown. The compound was applied at the rate of 8 pounds per acre from about a 2 percent by weight solution of the test compound in alcohol and/or acetone. The postemergence herbicidal activity was measured in the same way as the premergence activity; i.e., visual observation approximately 11 days after spraying, and expressed as the percent control of plant growth.

TABLE III

Compound applied—3-isopropyl-pyrido[3,2-d]pyrimidine-2,4(1H,3H)-dione

|  | Preemergence treatment, percent control | Postemergence treatment, percent control |
| --- | --- | --- |
| Alfalfa | 100 | 100 |
| Corn | 100 | 100 |
| Wild oats | 100 | 100 |
| Cheatgrass | 100 | 100 |
| Foxtail | 100 | 100 |
| Barnyardgrass | 100 | 100 |
| Crabgrass | 100 | 100 |
| Nutgrass | 100 | 80 |
| Johnsongrass | 100 | 90 |
| Curled dock | 80 | 100 |
| Snapbeans | 100 | 100 |
| Yellow rocket | 100 | 100 |
| Chickweed | 100 | 100 |
| Cucumber | 100 | 100 |
| Pigweed | 100 | 100 |
| Velvetleaf | 100 | 100 |
| Lambsquarters | 100 | 100 |

The same solutions of the same compound can also be sprayed, for example along railroad right-of-ways, at an application rate of about 2 to 16 pounds per acre as a total herbicide, i.e., to prevent all vegetation. The other compounds disclosed herein can be used as preemergence or protemergence herbicides in a similar manner. In the case of 3-cyclohexyl-pyrido[3,2-d]pyrimidine-2,4(1H,3H)-dione and 3-sec-butyl-pyrido[3,2-d]pyrimidine-2,4(1H,3H)-dione, substantially the same application rates, e.g., as similar or salt solutions in water, are effective; this is also generally true of the other members of the pyrido[3,2-d]pyrimidine-2,4(1H,3H)-dione family, although slightly higher application rates may be required. 3-benzyl-pyrido[3,2-d]pyrimidine-2,4(1H, 3H-dione has been found to be peculiarly effective because of its selectivity; for example, applied as described above, at an application rate of 16 pounds per acre, the benzyl compound showed no preemergence herbicidal activity against cucumbers, corn, or snapbeans, but total preemergence activity against alfalfa, cheatgrass, crabgrass, curled dock, chickweed, pigweed and lambsquarters.

Information concerning the substituted pyrido[3,2-d]pyrimidine-2,4(1H,3H)-dione family of compounds applied as described, and discussed above as having an unexpectedly high order of herbicidal activity, is presented in the following Table IV below. In Table IV, the entries under "Pre" refer to a preemergence test and those under "Post" refer to a postemergence test. All test results are at application rates of 8 pounds per acre except those of certain preemergence testing (16 pounds per acre or as otherwise indicated) as indicated by an asterisk following "Pre": "Pre*."

TABLE IV

| | Compound applied, percent control | | | | | | | | | | | | | |
|---|---|---|---|---|---|---|---|---|---|---|---|---|---|---|
| | Pyrido[3,2-d]pyrimidine-2,4(1H,3H)-dione (control) | | 3-ethyl-pyrido[3,2-d]pyrimidine-2,4(1H,3H)-dione | | 3-propyl-pyrido[3,2-d]pyrimidine-2,4(1H,3H)-dione | | 3-butyl-pyrido[3,2-d]pyrimidine-2,4(1H,3H)-dione | | 3-sec-butyl-pyrido[3,2-d]pyrimidine-2,4(1H,3H)-dione | | 3-allylpyrido[3,2-d]pyrimidine-2,4(1H,3H)-dione | | 3-(2-ethylhexyl)pyrido[3,2-d]pyrimidine-2,4(1H,3H)-dione | |
| | Pre* | Post | Pre* | Post | Pre* | Post | Pre* | Post | Pre* | Post | Pre* | Post | Pre* | Post |
| Alfalfa | 0 | 0 | 100 | 50 | 100 | 100 | 100 | 50 | 100 | 100 | 100 | 100 | 0 | 0 |
| Corn | 0 | 0 | 10 | 10 | 100 | 60 | 100 | 50 | 100 | 90 | 50 | 30 | 0 | 0 |
| Wild oats | 0 | 0 | 100 | 0 | 100 | 90 | 100 | 100 | 100 | 100 | 100 | 20 | 0 | 0 |
| Cheatgrass | 0 | 0 | 100 | 30 | 100 | 100 | 100 | 100 | 100 | 100 | 100 | 30 | 0 | 0 |
| Foxtail | 0 | 0 | 40 | 40 | 100 | 100 | 100 | 100 | 100 | 100 | 100 | 90 | 100 | 0 |
| Barnyardgrass | 0 | 0 | 40 | 10 | 100 | 100 | 100 | 100 | 100 | 100 | 100 | 90 | 100 | 0 |
| Crabgrass | 0 | 0 | 100 | 80 | 100 | 100 | 90 | 100 | 100 | 100 | 100 | 100 | 10 | 10 |
| Nutgrass | 0 | 0 | 10 | 10 | 20 | 70 | 100 | 90 | 100 | 100 | 100 | 20 | 30 | 0 |
| Johnsongrass | 0 | 0 | 60 | 60 | 100 | 100 | 100 | 100 | 100 | 100 | 90 | 100 | 0 | 0 |
| Curled dock | 0 | 0 | 100 | 90 | 100 | 100 | 100 | 90 | 100 | 100 | 100 | 100 | 0 | 10 |
| Snapbeans | 0 | 0 | 100 | 80 | 100 | 100 | 100 | 100 | 100 | 100 | 100 | 100 | 0 | 0 |
| Yellow rocket | 0 | 0 | 100 | 100 | 100 | 100 | 100 | 90 | 100 | 100 | 100 | 100 | 90 | 90 |
| Chickweed | 0 | 0 | 100 | 100 | 100 | 100 | 100 | 100 | 100 | 100 | 100 | 100 | 70 | 50 |
| Cucumber | 0 | 0 | 100 | 50 | 100 | 100 | 100 | 100 | 100 | 100 | 100 | 100 | 10 | 20 |
| Pigweed | 0 | 0 | 100 | 90 | 100 | 100 | 100 | 90 | 100 | 100 | 100 | 100 | 0 | 100 |
| Velvetleaf | 0 | 0 | 90 | 100 | 100 | 100 | 100 | 100 | 100 | 100 | 90 | 100 | 0 | 0 |
| Lambsquarters | 0 | 0 | 100 | 100 | 100 | 100 | 70 | 10 | 100 | 100 | 100 | 100 | 30 | 100 |

| | Compound applied, percent control | | | | | | | | | | | |
|---|---|---|---|---|---|---|---|---|---|---|---|---|
| | 3-cyclopropyl pyrido[3,2-d]pyrimidine-2,4(1H,3H)-dione | | 3-cyclohexyl pyrido[3,2-d]pyrimidine-2,4(1H,3H)-dione | | 3-cyclooctyl pyrido[3,2-d]pyrimidine-2,4(1H,3H)-dione | | 1,3-dimethyl pyrido[3,2-d]pyrimidine-2,4(1H,3H)-dione¹ | | 1-methyl-3-isopropyl pyrido[3,2-d]pyrimidine-2,4(1H,3H)-dione | | 3-benzyl pyrido[3,2-d]pyrimidine-2,4(1H,3H)-dione | |
| | Pre* | Post | Pre* | Post | Pre* | Post | Pre* | Post | Pre* | Post | Pre* | Post |
| Alfalfa | 100 | 0 | 100 | 30 | 100 | 60 | 0 | 0 | 100 | 70 | 100 | 0 |
| Corn | 10 | 0 | 90 | 40 | 50 | 0 | 0 | 0 | 0 | 0 | 10 | 0 |
| Wild oats | 80 | 60 | 100 | 100 | 100 | 40 | 0 | 0 | 100 | 20 | 30 | 0 |
| Cheatgrass | 100 | 0 | 100 | 80 | 100 | 30 | 0 | 0 | 100 | 40 | 100 | 0 |
| Foxtail | 10 | 0 | 100 | 100 | 100 | 80 | 0 | 0 | 20 | 40 | 90 | 0 |
| Barnyardgrass | 10 | 0 | 100 | 100 | 90 | 90 | 0 | 0 | 20 | 0 | 90 | 0 |
| Crabgrass | 100 | 10 | 100 | 100 | 100 | 100 | 10 | 0 | 50 | 0 | 100 | 40 |
| Nutgrass | 0 | 0 | 100 | 100 | 20 | 10 | 0 | 0 | 0 | 0 | 0 | 0 |
| Johnsongrass | 10 | 0 | 100 | 100 | 100 | 100 | 0 | 0 | 30 | 0 | 90 | 0 |
| Curled dock | 100 | 10 | 100 | 100 | 100 | 100 | 30 | 0 | 80 | 100 | 100 | 0 |
| Snapbean | 100 | 0 | 100 | 80 | 100 | 90 | 0 | 20 | 100 | 100 | 10 | 0 |
| Yellow rocket | 100 | 100 | 100 | 100 | 100 | 100 | 0 | 0 | 100 | 100 | 90 | 70 |
| Chickweed | 100 | 100 | 100 | 100 | 100 | 100 | 0 | 0 | 100 | 90 | 100 | 100 |
| Cucumber | 100 | 20 | 100 | 100 | 90 | 100 | 0 | 0 | 100 | 100 | 0 | 10 |
| Pigweed | 100 | 90 | 100 | 100 | 100 | — | 0 | 0 | 100 | 100 | 100 | 100 |
| Velvetleaf | 100 | 0 | 100 | 100 | 100 | 100 | 0 | 0 | 100 | 100 | 90 | 30 |
| Lambsquarters | 100 | 100 | 100 | 100 | 100 | 100 | 10 | 0 | 100 | 100 | 100 | 60 |

| | Compound applied, percent control | | | | | | | |
|---|---|---|---|---|---|---|---|---|
| | 3-cyclopentylpyrido[3,2-d]pyrimidine-2,4(1H,3H)-dione | | 3-cycloheptylpyrido[3,2-d]pyrimidine-2,4(1H,3H)-dione | | 3-α phenethylpyrido[3,2-d]pyrimidine-2,4(1H,3H)-dione | | 3-(2,2-dimethoxyethyl)-pyrido[3,2-d]pyrimidine-2,4(1H,3H)-dione | |
| | Pre | Post | Pre | Post | Pre | Post | Pre | Post |
| Corn | 100 | 80 | 100 | 30 | 30 | 0 | 0 | 0 |
| Wild oats | 100 | 90 | 100 | 100 | 95 | 0 | 20 | 30 |
| Cheatgrass | 100 | 60 | 100 | 100 | 90 | 0 | 20 | 0 |
| Foxtail | 100 | 100 | 100 | 100 | 70 | 20 | 20 | 0 |
| Barnyardgrass | 100 | 90 | 100 | 100 | 70 | 0 | 50 | 0 |
| Crabgrass | 100 | 100 | 100 | 100 | 95 | 0 | 90 | 0 |
| Nutsedge | 100 | 100 | 100 | 100 | 0 | 0 | 0 | 0 |
| Johnsongrass | 100 | 100 | 100 | 100 | 20 | 0 | 20 | 0 |
| Curled dock | 100 | 100 | 100 | 100 | 100 | 90 | 70 | 0 |
| Snapbeans | 100 | 100 | 100 | 100 | 95 | 20 | 100 | 100 |
| Chickweed | 100 | 100 | 100 | 100 | 100 | 90 | 0 | 0 |
| Cucumber | 100 | 100 | 100 | 100 | 0 | 30 | 40 | 40 |
| Pigweed | 100 | 100 | 100 | 100 | 100 | 70 | 100 | 30 |
| Velvetleaf | 100 | 100 | 100 | 100 | 100 | 80 | 100 | 80 |
| Lambsquarters | 100 | 100 | 100 | 100 | 100 | 100 | 95 | 50 |
| Mustard | 100 | 100 | 100 | 100 | 100 | 100 | 100 | 0 |
| Morning glory | 100 | 100 | 100 | 100 | 100 | 0 | 95 | 0 |

| | Compound applied, percent control | | | | | | | | | |
|---|---|---|---|---|---|---|---|---|---|---|
| | 3-(2-chlorobenzyl)-pyrido[3,2-d]pyrimidine-2,4(1H,3H)-dione | | 3-(3-chlorobenzyl)-pyrido[3,2-d]pyrimidine-2,4(1H,3H)-dione | | 3-(4-chlorobenzyl)-pyrido[3,2-d]pyrimidine 2,4(1H,3H)-dione | | 3-(3,4-dichlorobenzyl)-pyrido[3,2-d]pyrimidine-2,4(1H,3H)-dione | | 3-(2,4-dichlorobenzyl)-pyrido[3,2-d]pyrimidine-2,4(1H,3H)-dione | |
| | Pre | Post | Pre | Post | Pre | Post | Pre | Post | Pre | Post |
| Corn | 20 | 0 | 0 | 10 | 0 | 0 | 0 | 10 | 0 | 0 |
| Wild oats | 90 | 10 | 0 | 30 | 0 | 100 | 0 | 10 | 0 | 10 |
| Cheatgrass | 80 | 30 | 10 | 20 | 0 | 30 | 0 | -20 | 0 | 20 |
| Foxtail | 40 | 20 | 50 | 10 | 0 | 0 | 0 | 10 | 0 | 0 |
| Barnyardgrass | 80 | 0 | 20 | 20 | 0 | 0 | 0 | 20 | 0 | 10 |
| Crabgrass | 100 | 0 | 90 | 0 | 0 | 0 | 0 | 10 | 0 | 10 |
| Nutsedge | 0 | 0 | 0 | 0 | 0 | 0 | 0 | 0 | 0 | 0 |
| Johnsongrass | 30 | 10 | 30 | 10 | 0 | 50 | 0 | 20 | 0 | 20 |
| Curled dock | 100 | 60 | 0 | 20 | 0 | 60 | 0 | 0 | 0 | 0 |
| Snapbeans | 90 | 10 | 40 | 10 | 0 | 90 | 0 | 10 | 20 | 40 |
| Chickweed | 100 | 100 | 100 | 80 | 0 | 100 | 0 | 0 | 0 | 0 |
| Cucumber | 10 | 20 | 0 | 30 | 20 | 40 | 0 | 30 | 20 | 30 |
| Pigweed | 100 | 100 | 0 | 50 | 0 | 100 | 0 | 90 | 0 | 40 |
| Velvetleaf | 95 | 0 | 100 | 0 | 0 | 70 | 0 | 0 | 0 | 0 |
| Lambsquarters | 100 | 90 | 100 | 0 | 0 | 70 | 0 | 100 | 0 | 100 |
| Mustard | 100 | 100 | 0 | 0 | 0 | 90 | 0 | 30 | 0 | 0 |
| Morning glory | 0 | 0 | 0 | 0 | 0 | 0 | 0 | 0 | 30 | 0 |

See footnotes at end of table.

TABLE IV—Continued

| | Compound applied, percent control | | | | | |
|---|---|---|---|---|---|---|
| | 3-(4-methoxybenzyl)-pyrido [3,2-d]pyrimidine-2,4(1H,3H)-dione | | 3-[2-(2-pyridylethyl)]-pyrido [3,2-d]pyrimidine-2,4(1H,3H)-dione | | 3-(3-pyridylmethyl)-pyrido [3,2-d]pyrimidine-2,4(1H,3H)-dione | |
| | Pre | Post | Pre | Post | Pre | Post |
| Corn | 0 | 0 | 0 | 0 | 0 | 0 |
| Wild oats | 0 | 0 | 0 | 0 | 0 | 10 |
| Cheatgrass | 0 | 20 | 0 | 0 | 0 | 30 |
| Foxtail | 0 | 10 | 0 | 40 | 0 | 0 |
| Barnyardgrass | 0 | 10 | 0 | 0 | 0 | 10 |
| Crabgrass | 0 | 0 | 0 | 0 | 0 | 10 |
| Nutsedge | 0 | 0 | 0 | 0 | 0 | 0 |
| Johnsongrass | 0 | 10 | 0 | 0 | 20 | 10 |
| Curled dock | 0 | 0 | 0 | 0 | 0 | 0 |
| Snapbeans | 20 | 10 | 0 | 20 | 20 | 30 |
| Chickweed | 0 | 0 | 0 | 0 | 0 | 80 |
| Cucumber | 20 | 20 | 0 | 0 | 0 | 60 |
| Pigweed | 0 | 30 | 0 | 0 | 0 | 100 |
| Velvetleaf | 0 | 0 | 0 | 0 | 0 | 0 |
| Lambsquarters | 0 | 100 | 0 | 0 | 20 | 100 |
| Mustard | 0 | 0 | 0 | 100 | 0 | 100 |
| Morning glory | 0 | 20 | 0 | 0 | 0 | 0 |

| | Compound applied, percent control | | | | | | | |
|---|---|---|---|---|---|---|---|---|
| | 3-tetrahydrofurfurylpyrido [3,2-d]pyrimidine-2,4(1H,3H)-dione | | 3-phenylpyrido[3,2-d]pyrimidine-2,4(1H,3H)-dione | | 3-piperidinopyrido[3,2-d]pyrimidine-2,4(1H,3H)-dione | | 3-propargylpyrido[3,2-d]pyrimidine-2,4(1H,3H)-dione | |
| | Pre | Post | Pre | Post | Pre | Post | Pre[2] | Post |
| Corn | 20 | 0 | 20 | 10 | 100 | 30 | 0 | 0 |
| Wild oats | 20 | 0 | 90 | 0 | 100 | 100 | 0 | 0 |
| Cheatgrass | 0 | 0 | 100 | 30 | 100 | 70 | 0 | 20 |
| Foxtail | 0 | 0 | 90 | 40 | 100 | 100 | 0 | 0 |
| Barnyardgrass | 70 | 0 | 95 | 60 | 100 | 95 | 0 | 0 |
| Crabgrass | 95 | 10 | 100 | 25 | 100 | 30 | 20 | 0 |
| Nutsedge | 0 | 0 | 10 | 100 | 100 | 40 | 0 | 0 |
| Johnsongrass | 10 | 0 | 20 | 40 | 100 | 60 | 0 | 0 |
| Curled dock | 85 | 100 | 100 | 100 | 100 | 100 | 50 | 0 |
| Snapbeans | 100 | 100 | 100 | 100 | 100 | 100 | 20 | 0 |
| Chickweed | 20 | 30 | 100 | 100 | 100 | 100 | 0 | 0 |
| Cucumber | 100 | 90 | 100 | 95 | 100 | 100 | 30 | 30 |
| Pigweed | 50 | 50 | 100 | 100 | 100 | 100 | 50 | 0 |
| Velvetleaf | 95 | 100 | 100 | 100 | 100 | 100 | 0 | 0 |
| Lambsquarters | 100 | 100 | 90 | 100 | 100 | 100 | 100 | 30 |
| Mustard | 100 | 100 | 100 | 100 | 100 | 100 | 100 | 50 |
| Morning glory | 85 | 80 | 100 | 80 | 100 | 60 | 30 | 80 |

[1] Presented for purposes of comparision, and not in accordance with the invention.
[2] Determined at 2 pounds per acre application rate.

It will be appreciated from the foregoing data and discussion that the substituted pyrido[3,2-d]pyrimidine-2,4(1H,3H)-dione family of compounds described herein has unexpected utility as herbicides, and that this unexpected utility prevails throughout the family. For example, the showing of a high order of herbicidal activity for $C_2$ through $C_8$ alkyl substituents in the 3-position (3-substituted-pyrido[3,2-d]pyrimidine - 2,4(1H,3H) - dione family) demonstrates the high order of activity where the 3-substituent is an alkyl group having from 2 to 8 carbon atoms. Furthermore, the demonstration that allyl, as a 3-substituent, has substantially the same order of activity as does an isopropyl substituent in the 3-position shows that alkenyl substituents in the same position impart activity of the same order as is imparted by alkyl substituents and therefore, in view of the showing relative to such alkyl substituents, demonstrates utility for 3 alkenyl substituents having not more than 8 carbon atoms. Further, the demonstration of selectivity for a 3-benzyl substituent, as well as the showing of a high order of activity therefor, demonstrates utility for aralkyl substituents in the indicated position. When the substituent in the 3 position is a pyridyl substituted alkyl group, the compounds of the invention have somewhat lower activity, but are useful because of their selectivity. The high order of activity of the compound where the substituent in the 3-position is piperidino, coupled with the showing relative to alkyl substituents, demonstrates that the other methyleneimino substituents (4 to 6 methylene groups) are also highly active.

Similarly the showing of the high order of herbicidal activity for 1-methyl-3-isopropyl-pyrido[3,2-d]pyrimidine-2,4(1H,3H)-dione and essentially no activity for 1,3-dimethyl-pyrido[3,2-d]pyrimidine-2,4(1H,3H) - dione demonstrates the high order of activity for the 1,3- disubstituted compounds where the 1 and 3 substituents are dissimilar and where the 1-substituent is an alkyl group ranging from 1 to 4 carbon atoms in length.

It has been found that, where the 3-substituent is a cycloalkyl group, the pyrido[3,2-d]pyrimidine-2,4(1H,3H)-dione has a high order of herbicidal activity when the cycloalkyl group has from 3 to 8 carbon atoms. When the cycloalkyl group has 12 carbon atoms, however, the pyrido[3,2-d]pyrimidine-2,4(1H,3H) - dione is substantially inert as a herbicide. The herbicidal activity of 3-cycloalkyl pyrido[3,2-d]pyrimidine - 2,4(1H,3H)-diones, where the cycloalkyl group has 9, 10 or 11 carbon atoms has not presently been investigated, because the starting amines required to produce such compounds by the methods of Examples I and II are unavailable.

For practical use as herbicides, the compounds used in the method of this invention may be formulated with conventional agricultural carriers to obtain the desired concentration and to facilitate handling. For example, these compounds may be formulated into dusts by combining them with such materials as talc or clays. Wettable powder formulations may be obtained by adding a dispersing or suspending agent to the dust formulations referred to above.

If desired, the compounds may be applied as spray solutions which may be prepared by dissolving the compounds in suitable solvents, such as water, xylene, methylated naphthalenes, kerosenes, common agricultural oils, etc., in accordance with well established agricultural practices. The choice of solvent to be used will be dictated by the solubility of the compound sought to be sprayed in that particular solvent system. Generally, it has been found that the majority of these compounds have a relatively low order of water solubility, so that the use of common agricultural organic solvents is the preferred practice.

The compounds of this invention may also be emulsified or suspended in water by adding wetting agents or emulsifying agents to aqueous systems containing one or more of the chemical compounds falling under this disclosure. These emulsified formulations are suitable for use in spraying directly upon the locus sought to be protected from undesirable vegetation. So far as has been determined no significant difference in effect is realized from the use of aqueous emulsified formulations or from organic solvent solutions of these herbicides, providing, of course, that a similar amount of chemical is employed in each instance of use.

If desired, the compounds can be converted to their salt forms, then dissolved in water and applied as water solutions. They can also be applied as addition compounds and the like.

The alkali or alkaline earth metal and ammonium salts of the 3-substituted pyrido[3,2-d]pyrimidine-2,4-(1H,3H)-diones can be prepared by the reaction of the dione with the desired metal hydroxide or ammonium hydroxide.

Nitrogenous base addition compounds can be prepared by the addition of the desired nitrogenous base to a solution of the desired 3-substituted pyrido[3,2-d]pyrimidine-2,4(1H,3H)-dione in a suitable inert organic solvent. The addition compound can then be isolated by standard procedures.

Suitable nitrogenous bases are substituted, unsubstituted, cyclic and acyclic amines and guanidines. The amines can be primary, secondary or tertiary amines, polyamines, arylamines, or heterocyclic amines.

Phenolic complexes are formed readily by co-melting the 3-substituted pyrido[3,2-d]pyrimidine-2,4(1H,3H)-dione and phenol in a 1:1 to 2:1, pyridopyrimidinedione: phenol ratio. They can also be formed by co-dissolving the reactants, in the same ratio in a nonpolar solvent such as nitromethane or a mixture of nitromethane and cyclohexane.

Acid addition compounds can be prepared by mixing a 3-substituted pyrido[3,2-d]pyrimidine-2,4[1H,3H)-dione with an appropriate acid, at room temperature, in a liquid aromatic hydrocarbon solvent. The reaction is immediate. Generally any aromatic hydrocarbon can be used, but it is preferred that it be liquid between 20° and 30°. Benzene, toluene and xylene are examples of satisfactory solvents.

The acid addition compounds can be precipitated with an excess of non-solvent liquid paraffin such as pentane, hexane, heptane or petroleum ether. The product precipitates as a solid or a viscous oil which can be separated by filtration or vacuum evaporation. Alternatively, the product can be separated by vacuum evaporation of the reaction medium at low temperatures, preferably below 50°. Precipitation with a non-solvent is the usual method.

Most acids having an ionization constant greater than $2 \times 10^{-5}$ will form 3-substituted pyrido[3,2-d]pyrimidine-2,4(1H,3H)-dione addition compounds. Preferred acids are halogenated aliphatic acids containing from 2 to 5 carbon atoms, halogenated benzoic acid, halogenated phenylacetic acids, halogenated phenoxy acetic acids, organic sulfonic acids, organic phosphonic acids and inorganic phosphoric acids. These acids are preferred because the pyridopyrimidinedione addition compounds formed from them are highly phytotoxic and show good oil solubility.

The preparation of various complexes, acid addition compounds and the like is described in Examples B–F below:

Example B

Preparation of the 2:1 complex of 3-isopropylpyrido[3,2-d]pyrimidine-2,4(1H,3H)-dione with p-methoxyphenol.—A 50 ml. flask, equipped with a stirrer and heating mantle was charged with 7.5 g. 3-isopropylpyrido[3,2-d]pyrimidine-2,4(1H,3H)-dione and 2 g. p-methoxyphenol. While being agitated, the reaction mixture was heated to a temperature of 180–200°. It was maintained at 180–200° for 2–5 minutes. The reaction mixture was then cooled, and solidified. The solid material was ground into a powder. The yield was 8.2 g. of the 2:1 complex of 3-isopropylpyrido[3,2-d]pyrimidine-2,4(1H,3H)-dione with p-methoxyphenol having a melting point of 195–240°.

Example C

Preparation of ethanolamine salt of 3-isopropylpyrido[3,2-d]pyrimidine-2,4(1H,3H)-dione.—A 50 ml. flask was charged with 5 g. 3-isopropylpyrido[3,2-d]pyrimidine-2,4(1H,3H)-dione and 20 g. ethanolamine. The mixture was allowed to stand for 24 hours, at which time a clear solution of the ethanolamine salt of 3-isopropylpyrido[3,2-d]pyrimidine-2,4(1H,3H)-dione formed.

Example D

Preparation of the ethylenediamine salt of 3-isopropylpyrido[3,2-d]pyrimidine-2,4(1H,3H)-dione.—A 250 ml. 3-necked flask, equipped with a stirrer, dropping funnel, and heating mantle was charged with 150 ml. acetonitrile and 5.1 g. 3-isopropylpyrido[3,2-d]pyrimidine-2,4(1H,3H)-dione.

Agitation was begun and the mixture was heated to dissolve the components and prepare a saturated solution. The solution was cooled to room temperature and then charged with 1.5 g. ethylenediamine. The reaction mixture was then stirred for 2 hours at room temperature. The product which precipitated during this time was filtered from the mixture and dried. The yield was 5.1 g. of product having a melting point of 252–5°.

Example E

Preparation of a 1:1 complex of trichloroacetic acid with 3-isopropylpyrido[3,2-d]pyrimidine-2,4(1H,3H)-dione.—A 250 ml. 3-necked flask equipped with a stirrer was charged with 5.1 g. 3-isopropylpyrido[3,2-d]pyrimidine-2,4(1H,3H)-dione, 4.1 g. trichloroacetic acid, and 50 ml. xylene. The reaction mixture was stirred for approximately 7 hours, at which time an additional 20 ml. of xylene were added. The reaction mixture was stirred overnight. The next morning 150 ml. of n-hexane was charged to the reaction mixture with stirring. Stirring was continued and an hour later the mixture was filtered and a white solid recovered and dried. The yield was 9.4 g. of product having a melting point of 150–1°. Infrared analysis showed the formation of a complex, believed to be the 1:1 complex of trichloroacetic acid and 3-isopropylpyrido[3,2-d]pyrimidine-2,4(1H,3H)-dione.

Example F

Preparation of the tetramethylammonium salt of 3-isopropylpyrido[3,2-d]pyrimidine-2,4(1H,3H)-dione.—A 100 ml. 3-necked flask equipped with a stirrer, condenser, thermometer, and nitrogen atmosphere system was assembled. The nitrogen was turned on and 5.5 g. tetramethylammonium chloride, 11.6 g. silver oxide, and 50.0 ml. water was charged to the flask. A brown thin slurry formed. The reaction mixture was filtered and the filtrate returned to the flask. The temperature at this point was 25°. 5.1 g. 3-isopropylpyrido[3,2-d]pyrimidine-2,4(1H,3H)-dione was then charged to the flask over a ten minute period. The reaction mixture turned a light yellow. One-half hour later another 5.1 g. portion of 3-isopropylpyrido[3,2-d]pyrimdine-2,4(1H,3H)-dione was charged, again over a ten minute period. Some material failed to dissolve. After ten minutes it was removed by filtration and the filtrate was evaporated to dryness. The residue was dissolved in 10 ml. tap water, and the solution heated and then filtered. The filtrate was again evaporated to dryness.

The yield was 14 g. of white material having a melting point of 164–196°. Nuclear magnetic resonance analysis confirmed the structure to be that of the tetramethylammonium salt of 3 - isopropyl[3,2-d]pyrido - 2,4(1H,3H)-dione, with one molecule of water in the structure.

The herbicidal activity of those compounds produced in Examples B–F was found to be substantially the same as the herbicidal activity of 3 - isopropylpyrido[3,2-d]pyrimidine-2,4(1H,3H)-dione, when applied at the same active ingredient rate.

From the foregoing results it is apparent that the compounds falling within the scope of this invention possess unexpected herbicidal properties. Moreover, it has been shown that these compounds display a high rate of herbicidal activity while simultaneously demonstrating selectivity with respect to desirable, economic crops.

So far as concerns the amount of herbicide to be used this, of course, is subject to such considerations as the type of treatment to be made, the area to be treated, the type of weed sought to be controlled and the stage of development of the species being treated as well as the particular herbicides selected. Generally, however, concentrated herbicidal compositions of the present invention are prepared so as to contain from 5 to about 60 percent of the active herbicidal component. Compositions which are suitable for "as is" application generally contain from 0.1 percent to about 10 percent of active herbicidal component.

The 3-substituted-pyrido[3,2-d]pyrimidine-2,4(1H,3H)-diones according to the invention have also been found to be useful as aquatic herbicides, the compounds where the 3-substituent is a cycloalkyl group being preferred for this use. Specifically, by way of example, 3-cyclohexyl-pyrido[3,2-d]pyrimidine-2,4(1H,3H)-dione and 3 - cyclooctylpyrido[3,2-d]pyrimidine - 2,4(1H,3H) - dione have been found to provide one hundred percent kill of duckweed, salvinia, and elodea in concentrations of ten parts per million parts of water, while 3-cycloheptylpyrido-[3,2-d]pyrimidine-2,4(1H,3H)-dione has been found to provide one hundred percent kill of these three aquatic species in a concentration of five parts per million parts of water, by weight in both cases.

What we claim is:

1. Compounds of the formula

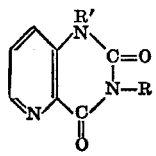

wherein R and R' are always dissimilar, wherein R is a member of the group consisting of alkyl groups having from 2 to 8 carbon atoms, dimethoxyethyl, aralkyl groups where the alkyl portion has from 1 to 2 carbon atoms and the aromatic portion is phenyl or a substituted phenyl having 1 or 2 methyl, methoxy or chlorine substituents on the benzene ring, cycloalkyl groups having from 3 to 8 carbon atoms, pyridyl substituted alkyl groups having from 1 to 2 carbon atoms, alkenyl groups having not more than 8 carbon atoms, tetrahydrofurfuryl, pyrrolidino, piperidino, homopiperidino, septamethyleneimino, and phenyl, and wherein R' is hydrogen or methyl, with the proviso that when R' is methyl R is isopropyl.

2. The compound of claim 1 wherein R is isopropyl and R' is methyl.
3. The compound of claim 1 wherein R' is hydrogen.
4. The compound of claim 1 wherein R is isopropyl and R' is hydrogen.
5. The compound of claim 1 wherein R is sec-butyl and R' is hydrogen.
6. The compound of claim 1 wherein R is cyclohexyl and R' is hydrogen.
7. The compound of claim 1 wherein R is benzyl and R' is hydrogen.
8. The compound of claim 1 wherein R is cyclooctyl and R' is hydrogen.
9. The compound of claim 1 wherein R is allyl and R' is hydrogen.
10. The compound of claim 1 wherein R is cyclopentyl and R' is hydrogen.
11. The compound of claim 1 wherein R is phenyl and R' is hydrogen.
12. The compound of claim 1 wherein R is cycloheptyl and R' is hydrogen.

References Cited
UNITED STATES PATENTS
3,244,503  4/1966  Watts.
3,291,592  12/1966  Evans.
3,322,526  5/1967  Loux.

OTHER REFERENCES
Oakes et al., Chem. Abstracts, 50: 15545–6 (1956).

RICHARD J. GALLAGHER, Primary Examiner

U.S. Cl. X.R.
71—92; 260—295.5